US009114954B2

(12) United States Patent
Boschin et al.

(10) Patent No.: US 9,114,954 B2
(45) Date of Patent: Aug. 25, 2015

(54) ACTIVE GUIDING AND BALANCE SYSTEM FOR AN ELEVATOR

(75) Inventors: Fernando Boschin, Esteio (BR); Joao Paulo Da Costa Brusque, Porto Alegre (BR); Marcelo De Fraga Carvalho, Cachoeirinha (BR); Leoci Rudi Galle, Porto Alegre (BR); Rory S. Smith, El Cajon, CA (US)

(73) Assignee: ThyssenKrupp Elevator Corporation, Atlanta, GA (US)

(*) Notice: Subject to any disclaimer, the term of this patent is extended or adjusted under 35 U.S.C. 154(b) by 385 days.

(21) Appl. No.: 12/471,052

(22) Filed: May 22, 2009

(65) Prior Publication Data

US 2009/0308697 A1 Dec. 17, 2009

Related U.S. Application Data

(60) Provisional application No. 61/055,794, filed on May 23, 2008.

(51) Int. Cl.

*B66B 7/04* (2006.01)
*H02K 7/00* (2006.01)
*H02K 41/02* (2006.01)
*B66B 5/02* (2006.01)
*B66B 5/00* (2006.01)

(52) U.S. Cl.

CPC ................. *B66B 5/02* (2013.01); *B66B 5/0018* (2013.01); *B66B 7/042* (2013.01); *B66B 7/044* (2013.01)

(58) Field of Classification Search

USPC ................. 187/410, 393, 409; 310/51, 12.01, 310/12.04, 15, 17; 188/164
IPC ......................................................... B66B 7/07
See application file for complete search history.

(56) References Cited

U.S. PATENT DOCUMENTS

| | | | |
|---|---|---|---|
| 4,097,833 | A | 6/1978 | Myers |
| 4,281,263 | A | 7/1981 | Virolleau et al. |
| 4,318,038 | A | 3/1982 | Munehiro |
| 4,344,022 | A | 8/1982 | von der Heide |
| 4,456,934 | A | 6/1984 | Wedman et al. |
| 4,460,855 | A | 7/1984 | Kelly |
| 4,520,906 | A | 6/1985 | Watanabe |
| 4,754,849 | A | 7/1988 | Ando |

(Continued)

FOREIGN PATENT DOCUMENTS

| | | |
|---|---|---|
| AU | 669930 B2 | 6/1996 |
| EP | 1 547 955 | 6/2005 |

(Continued)

OTHER PUBLICATIONS

Celniker, G.W., et al., "Rail Vehicle Active Suspensions for Lateral Ride and Stability Improvement", J. Dyn. Sys., Meas., Control, Mar. 1, 1982, 104(1), pp. 100-106, abstract only, 2 pgs.*

(Continued)

*Primary Examiner* — William E Dondero
*Assistant Examiner* — Minh Truong
(74) *Attorney, Agent, or Firm* — Frost Brown Todd LLC

(57) ABSTRACT

An active guiding and balance system that retains the active control of an elevator system in the presence of displacement. This active control may be maintained via the use of an actuator that tailors Lorentz force relative to the level of displacement along a non-linear continuum.

20 Claims, 14 Drawing Sheets

(56) References Cited

U.S. PATENT DOCUMENTS

| | | | | |
|---|---|---|---|---|
| 4,758,750 | A * | 7/1988 | Itagaki et al. | 310/13 |
| 4,827,163 | A | 5/1989 | Bhate et al. | |
| 4,924,123 | A | 5/1990 | Hamajima et al. | |
| 5,020,639 | A | 6/1991 | Michel | |
| 5,027,925 | A | 7/1991 | Kahkipuro | |
| 5,055,725 | A | 10/1991 | LaSota | |
| 5,081,381 | A | 1/1992 | Narasaki | |
| 5,086,882 | A | 2/1992 | Sugahara et al. | |
| 5,099,158 | A * | 3/1992 | Stuart et al. | 310/14 |
| 5,117,946 | A | 6/1992 | Traktovenko et al. | |
| 5,136,194 | A | 8/1992 | Oudet et al. | |
| 5,151,562 | A | 9/1992 | Fujita et al. | |
| 5,193,651 | A | 3/1993 | Shigeta et al. | |
| 5,208,498 | A | 5/1993 | Hamajima | |
| 5,214,561 | A * | 5/1993 | Morita | 361/187 |
| 5,231,337 | A | 7/1993 | van Namen | |
| 5,289,902 | A | 3/1994 | Fujita | |
| 5,294,757 | A * | 3/1994 | Skalski et al. | 187/393 |
| 5,322,144 | A | 6/1994 | Skalski et al. | |
| 5,329,077 | A | 7/1994 | Skalski et al. | |
| 5,368,132 | A | 11/1994 | Hollowell et al. | |
| 5,379,864 | A * | 1/1995 | Colby | 187/393 |
| 5,439,075 | A * | 8/1995 | Skalski et al. | 187/410 |
| 5,535,853 | A * | 7/1996 | Skalski | 187/410 |
| 5,544,721 | A | 8/1996 | Roberts | |
| 5,597,988 | A | 1/1997 | Skalski | |
| 5,652,414 | A | 7/1997 | Roberts et al. | |
| 5,749,444 | A | 5/1998 | Skalski | |
| 5,765,663 | A | 6/1998 | Jamieson et al. | |
| 5,810,120 | A | 9/1998 | Jamieson et al. | |
| 5,811,743 | A | 9/1998 | Kohara et al. | |
| 5,814,774 | A | 9/1998 | Remmers et al. | |
| 5,824,976 | A | 10/1998 | Jamieson et al. | |
| 5,864,102 | A | 1/1999 | Jamieson et al. | |
| 5,896,949 | A | 4/1999 | Hamdy et al. | |
| 5,929,399 | A | 7/1999 | Jamieson et al. | |
| 5,955,709 | A * | 9/1999 | Traktovenko et al. | 187/292 |
| 6,305,502 | B1 | 10/2001 | He et al. | |
| 6,318,505 | B1 | 11/2001 | De Angelis | |
| 6,401,872 | B1 * | 6/2002 | Morishita | 187/292 |
| 6,474,449 | B1 | 11/2002 | Utsunomiya et al. | |
| 6,494,295 | B2 | 12/2002 | Grundmann | |
| 6,959,787 | B2 | 11/2005 | Husmann | |
| 7,455,466 | B2 * | 11/2008 | Chang et al. | 396/508 |
| 8,212,435 | B2 * | 7/2012 | Binnard et al. | 310/15 |
| 8,362,751 | B2 * | 1/2013 | Lin et al. | 322/3 |
| 2002/0179377 | A1 | 12/2002 | Higaki et al. | |
| 2003/0111302 | A1 * | 6/2003 | Utsunomiya et al. | 187/410 |
| 2004/0011979 | A1 * | 1/2004 | Seo et al. | 251/129.1 |
| 2004/0055836 | A1 * | 3/2004 | Pribonic et al. | 188/164 |
| 2005/0087400 | A1 * | 4/2005 | Zhou | 187/277 |
| 2005/0094118 | A1 * | 5/2005 | Dams | 355/53 |
| 2007/0000733 | A1 * | 1/2007 | Takeuchi et al. | 187/351 |
| 2007/0056958 | A1 * | 3/2007 | Shinohira et al. | 219/619 |

FOREIGN PATENT DOCUMENTS

| | | | |
|---|---|---|---|
| GB | 2 262 932 | | 7/1993 |
| JP | H02-23185 | A | 1/1990 |
| JP | H03-23185 | A | 1/1991 |
| JP | H05-92886 | A | 4/1993 |
| JP | 5124783 | | 5/1993 |
| JP | 05-193841 | | 8/1993 |
| JP | 2008-007271 | | 8/1993 |
| JP | H05-319739 | A | 12/1993 |
| JP | H06-80354 | A2 | 3/1994 |
| JP | 6092573 | | 4/1994 |
| JP | H06-286963 | A | 10/1994 |
| JP | H06-329366 | A | 11/1994 |
| JP | 08-067427 | | 3/1996 |
| JP | 2003/002557 | | 1/2003 |
| JP | 2005/298073 | | 10/2005 |
| WO | WO 93/01646 | | 1/1993 |
| WO | WO 2005/007549 | | 1/2005 |

OTHER PUBLICATIONS

Inaba, H., et al., "Attitude control system of a super-high speed elevator car based on magnetic guides", IECON '94, 20th International Conference on Industrial Electronics, Control and Instrumentation, 1994, vol. 2, pp. 1028-1033, abstract only, 2 pgs.*

Nai, K., et al., "Vibration reduction techniques for high speed passenger elevators", Control Application, 1994, Proceedings of the Third IEEE Conference, Aug. 24-26, 1994, pp. 965-970 vol. 2, abstract only, 2 pgs.*

Ovaska, S.J., "Electronic and Information technology in high-range elevator systems", Mechatronics, vol. 2, Issue 1, Feb. 1992, pp. 89-99, abstract only, 3 pgs.*

Pollack, A., "In Japan, It's the Big Race for the World's Fastest Elevator," The Oregonian, Portland, OR, Sep. 26, 1993, J13, 3 pgs.*

Abstract of JP 5124783.

Canadian Examiner Report dated Jun. 4, 2012 for Application No. CA 2,724,891.

International Preliminary Report on Patentability dated Nov. 23, 2010 for Application No. PCT/US2009/045022.

International Search Report dated Jan. 15, 2010 for Application No. PCT/US2009/045022.

English Abstract of Japanese Application No. JP 05-193841.

English Abstract of Japanese Application No. JP 08-067427.

English Abstract of Japanese Application No. JP 2008-007271.

Supplementary Partial Search Report dated Nov. 21, 2014 for Application No. EP 09751678.5.

Supplementary European Search Report and Written Opinion dated Apr. 8, 2015 for Application No. EP 09 75 1678.

* cited by examiner

ACTIVE GUIDING AND BALANCE SYSTEM FOR AN ELEVATOR

FIELD OF THE INVENTION

The present invention relates, in general, to elevators and, in particular, to an active guiding and balance system for an elevator.

BACKGROUND OF THE INVENTION

Elevators are generally guided in an elevator shaft by guide rails that are affixed to the building structure. The elevator generally includes a sling that is hoisted by cables and a cabin that is mounted within the sling. The elevator cabin is normally isolated from the sling by elastomeric dampers, springs, or a combination of springs and elastomeric dampers.

Typically, an elevator car is guided by guide rails in such a manner that guide elements of guide devices provided in the elevator car come into contact with the guide rails, which are vertically arranged on side walls of a hoistway. However, errors frequently occur in the installation of the guide rails such that they are misaligned, and further deflection is often caused in the guide rail by a load given to the car, and a small level difference and winding may be caused in the guide rail with age. Accordingly, the elevator may be vibrated in the up and down direction (elevating direction) and/or the side to side direction (direction perpendicular to the elevating direction). Guide rails are likely never to be perfectly aligned. The misalignment of the guide rails can additionally be caused, for example, by installation errors, building settlement, or building movement, such as occurs in tall buildings during windy conditions. It is not uncommon to find that the misalignment of the guide rails is caused by all of these factors. Additionally, vertical vibrations caused by such things as torque ripple in the drive system may be transmitted to the sling and therefore to the elevator cabin via the ropes. The characteristics of ropes as string resonators are often such that vertical vibrations quickly manifest themselves as horizontal vibrations that are sensed in the cabin. Aerodynamic buffering may also create vibrations in the elevator cabin.

Misalignment of the guide rails and other factors frequently result in vibration that is felt by passengers. Such vibrations are often uncomfortable and may be anxiety inducing to passengers. In addition to being uncomfortable and a psychological stressor, the vibrations also may have a real effect on the life expectancy of various elevator components due to inconsistent wear and/or consistent or frequent detrimental vibratory stress.

Conventionally, in order to reduce the longitudinal and the lateral vibration, an elastically supporting member or a vibration isolating member for reducing an input of displacement given by the guide rail is arranged between the cage and the car frame or between the car frame and the guide element. In such situations, generally, to provide significant isolation of vibration, it is necessary to reduce the rigidity of the elastically supporting member and the vibration isolating member. On the other hand, in order to prevent the occurrence of interference of the cage with other components when an unbalanced load is given to the cage, it may be necessary to somewhat increase the rigidity. For the above reasons, it may be difficult to design an elevator for which a sufficiently high vibration isolating effect can be provided where, concomitantly, no problems are caused even if an unbalanced load is given to the cabin.

Numerous systems have been developed in attempts to attenuate longitudinal and lateral vibrations. Many of such systems are based on the sky hook dampener concept. U.S. Pat. No. 6,474,449, the disclosure of which is incorporated herein by reference, teaches such a system that uses an approach that produces a constant vibration correcting force regardless of the position of the actuator, the asymmetric load in the car, or the disturbing force. In such systems, attention is generally given to an active vibration isolating method, in which a force to suppress vibration is given from the outside, instead of a passive vibration isolating method such as a damper. In the '449 patent, an active vibration isolating method is disclosed in which an electric current is made to flow in a coil so as to generate a magnetic field at the center (axial center) of the coil. Also, vibration is reduced by a magnetic force when a reaction bar made of magnetic body is arranged at a position opposed to the magnetic field.

In addition to reducing vertical and horizontal vibration, numerous elevator safety systems have been developed to protect passengers and components in the event of a mechanical failure or environmental event. Roller guides are generally equipped with stops that limit their travel. For example, if excessive travel exists, then the braking shoes of the associated safety gear will contact the rails of the elevator and may then engage the brake shoes bringing the cabin to an emergency stop.

In seismic areas, auxiliary guiding means may be provided at each guide shoe to continue to guide the elevator cabin even if the normal guide shoes have failed such as, for example, during an earthquake. However, the auxiliary guide rails are often simply notched steel plates, where the contact between the steel plates and the rails may produce an uncomfortable ride for passengers.

Elevator cabins are normally loaded in such a way that the center of gravity of the cabin does not coincide with the center of suspension. These circumstances may cause the cabin to tilt and also may cause the springs or the roller guide to be compressed unequally. While this condition exists routinely with passive roller guides, it can create special problems for active systems. In order to prevent these conditions, roller guides may be provided with mechanical stops that limit their travel. If a cabin is asymmetrically loaded in an extreme condition an active roller guide may be dictated to move in a direction that will cause impact with one of the stops. Such an impact may be uncomfortable to the elevator passengers and may start or exacerbate an unstable condition in which the active damping system goes into resonance. Such a condition may be anxiety producing, damaging to the elevator system, or dangerous for the passengers.

An actuator described in U.S. Pat. No. 6,474,449 has an almost linear force profile over its displacement range, such as shown in FIG. 1. While such a system may be easy to control under normal operating conditions, it may not prevent or control runaway instability or resonance.

European Patent Application EP-01547955A1 teaches that all closed loop drive systems can become unstable and oscillate to resonance. This is particularly true of elevator active guidance systems. The described system disconnects the active guidance system when it becomes unstable. Although this approach may stop the instability, it may also eliminate the ride quality that an active system attempts to achieve. Additionally, such a system may not be cost effective.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

Reference will now be made in detail to the present preferred embodiment of the invention, an example of which is illustrated in the accompanying drawings.

DETAILED DESCRIPTION OF THE INVENTION

Figure 2:
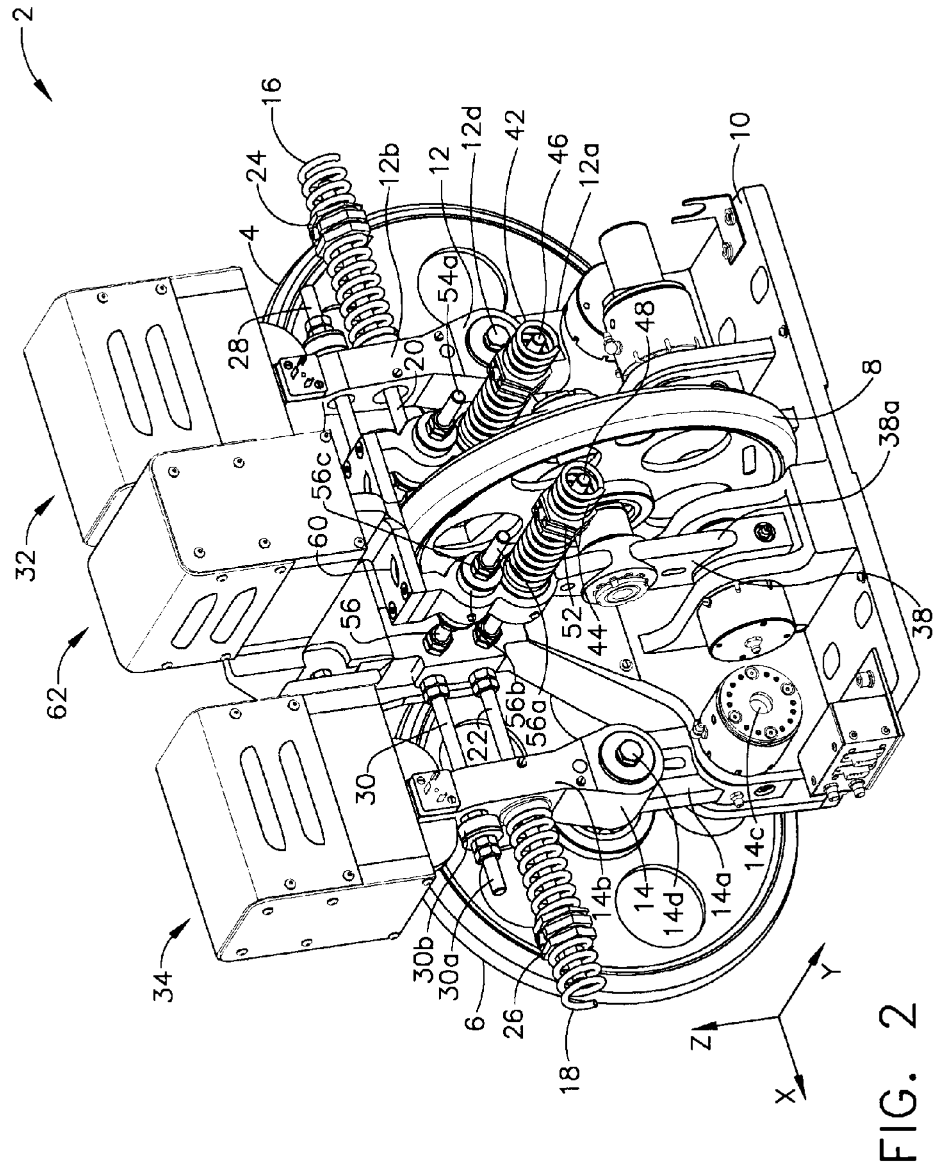
FIG. 2 is a perspective view of an active guiding and balance device constructed in accordance with the teachings of the present invention.
Figure 3:
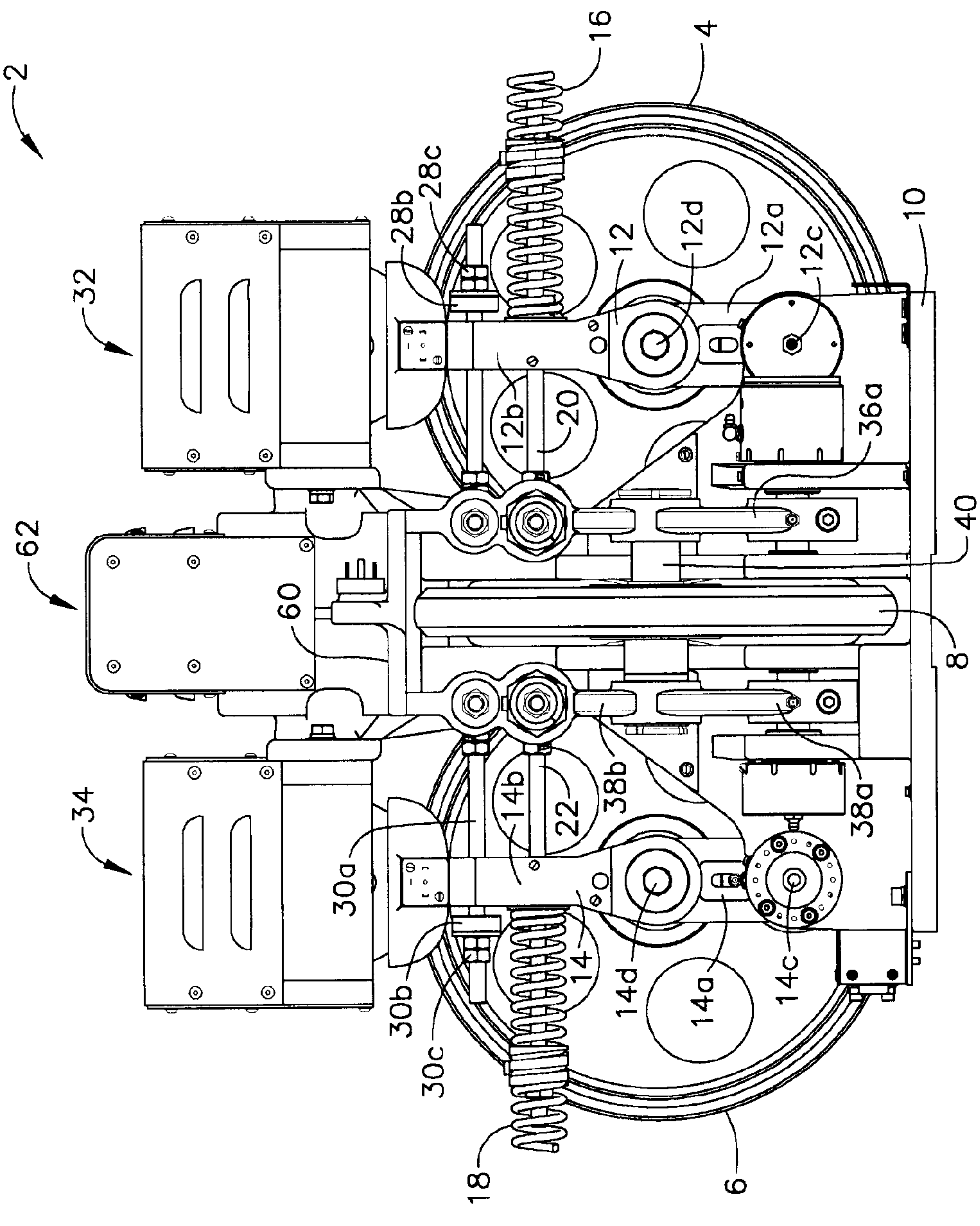
FIG. 3 is a first side view of the active guiding and balance device of FIG. 2.
Figure 4:
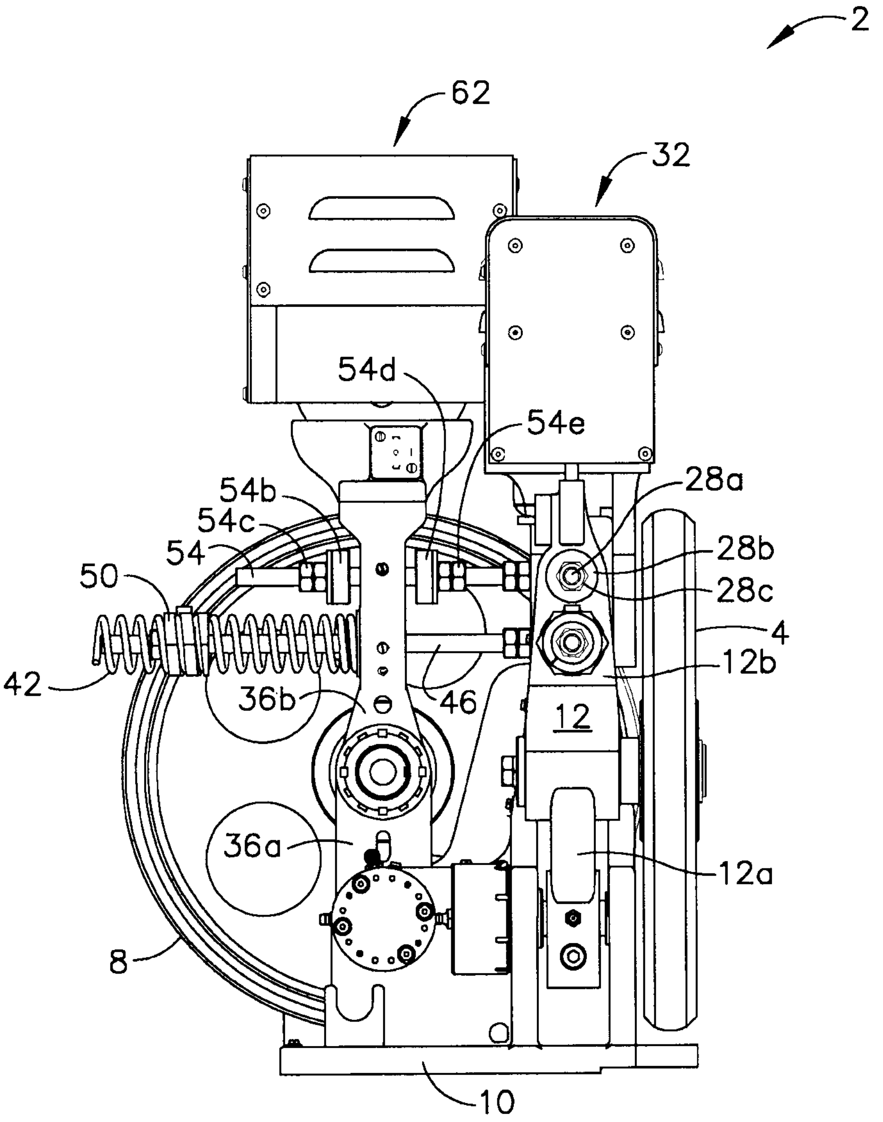
FIG. 4 is a second side view of the active guiding and balance device of FIG. 2.
Figure 5:
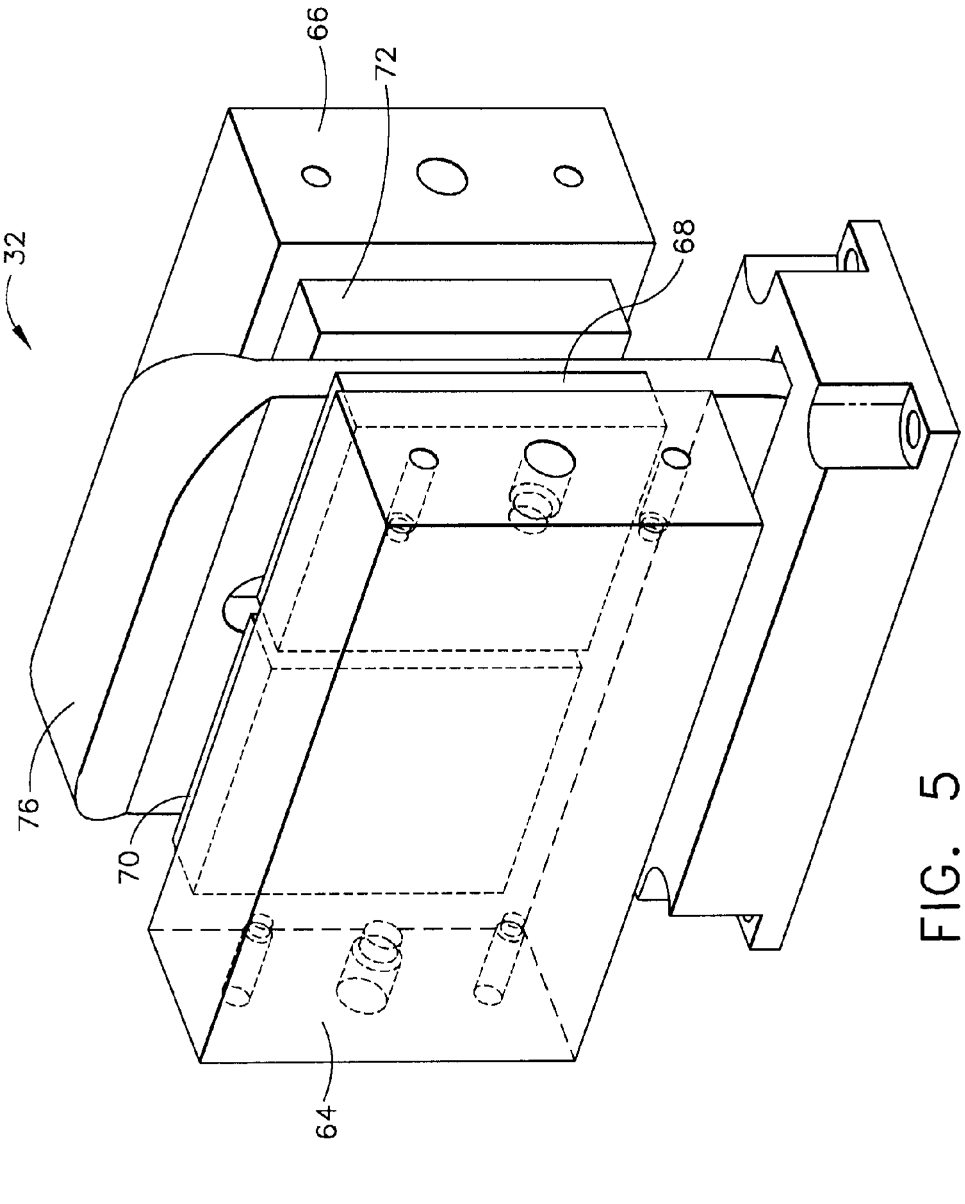
FIG. 5 is a diagrammatic perspective view of a version of the actuator of FIG. 2.

Referring now to the drawings in detail, wherein like numerals indicate the same elements throughout the views, FIGS. 2, 3 and 4 are views of an active guiding and balancing device constructed according to the present invention. An active guide system is one equipped with actuators such as motors or solenoids that augment or diminish the spring force on the guiding devices of the active guide system in response to a control system that determines the dampening requirements of the system to counteract the accelerations of the elevator system to create zero acceleration in the car. The control system may use sensors, such as accelerometers to detect acceleration of the elevator car and actuators to effect the dampening requirements.

Figure 1:
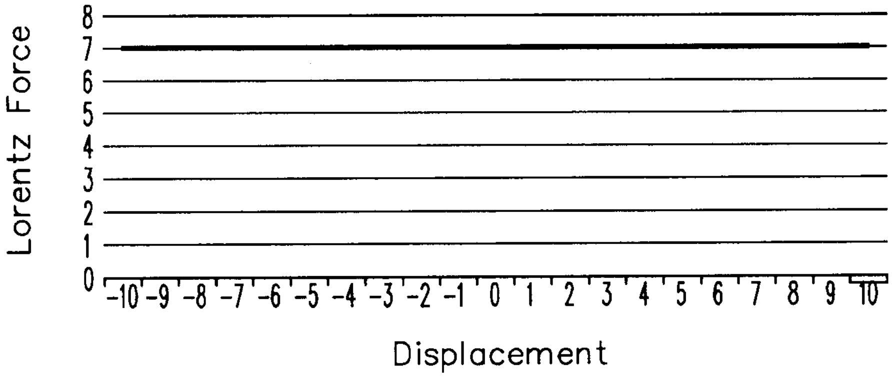
FIG. 1 (PRIOR ART)
FIG. 1 illustrates an almost linear force profile over its displacement range of an actuator described in U.S. Pat. No. 6,474,449.

As seen in FIGS. 2-4, there is shown roller guide assembly indicated generally at 2. As is known, a plurality of roller guide assemblies 2 are used on an elevator car at spaced apart locations to engage guide rails (not shown in FIGS. 2-4), similar to that depicted in FIG. 1 of U.S. Pat. No. 6,474,449, the disclosure of which is incorporated herein by reference. Roller guide assembly 2 includes two spaced apart rollers 4 and 6 lying in the XZ plane, and roller 8 lying in the YZ plane. The construction of rollers 4, 6 and 8 are similar, with rollers 4 and 6 mirroring each other. Roller guide assembly 2 includes base 10 which is mounted directly or indirectly to the elevator car (not shown) and which carries rollers 4, 6 and 8. Each roller 4, 6 includes respective lever arms 12, 14, depicted in FIGS. 2-4 as a respective assembly of lower lever arm 12*a*, 14*a* and upper lever arm 12*b*, 14*b*. Each lower lever arm 12*a*, 14*a*, is bearingly carried by base 10, pivotable about a respective pivot axis 12*c* and 14*c*. Each lever arm 12, 14, rotatably carries rollers 4, 6, respectively, bearingly supported thereby about respective roller shafts 12*d*, 14*d* (not seen completely). Each upper lever arm 12*b*, 14*b*, is resiliently urged inwardly in the direction toward the guide rail (not shown) and therefore toward each other by respective biasing members 16, 18 carried by respective cantilevered shafts 20, 22, supported by base 10, which extend through respective openings of upper lever arms 12*b*, 14*b*. Although biasing members 16, 18 are illustrated as springs, any suitable biasing device may be used. In the embodiment depicted, the force exerted by biasing members 16, 18, against upper lever arms 12*b*, 14*b* (and resisted by the guide rail through rollers 4 and 6) may be adjusted by the position of members 24, 26. Outward movement of lever arms 12, 14, is limited by restraints 28, 30, respectively. Each respective restraint 28, 30, includes cantilevered shaft 28*a*, 30*a* extending from base 10, and rubber bumper 28*b*, 30*b*, the positions of which can be adjusted by positioning retainers 28*c*, 30*c*, illustrated as nut pairs. Restraints 28, 30 may be of any suitable construction or components. At the respective distal ends of lever arms 12, 14, are disposed respective actuators generally indicated at 32, 34, the details of which will be discussed later. Although in the embodiment depicted each roller 4, 6 has a respective actuator 32, 34 which function independent of each other, the movement of rollers 4, 6 could be made interdependent, with a single actuator disposed to dampen the oscillations acting on the frame.

Still referring to FIGS. 2-4, the configuration of the supporting structure for roller guide 8 is similar to that described above. Roller guide 8 is supported on either side by two spaced apart lever arms 36, 38, depicted in FIGS. 2-4 as a respective assembly of lower lever arm 36*a*, 38*a*, and upper lever arm 36*b*, 38*b*. Each lower lever arm 36*a*, 38*a*, a pair is bearingly carried by base 10, pivotable about a respective pivot axis 36*c* and 38*c*. Each lever arm 36, 38, cooperatively rotatably carries roller 8, bearingly supported thereby about roller shaft 40, with roller shaft 40 being bearingly supported at each end by lever arms 36, 38, respectively. Each upper lever arm 36*b*, 38*b*, is resiliently urged inwardly in the direction toward the guide rail (not shown) by respective biasing members 42, 44 carried by respective cantilevered shafts 46, 48, supported by base 10, which extend through respective openings of upper lever arms 36*b*, 38*b*. Although biasing members 42, 44 are illustrated as springs, any suitable biasing device may be used. In the embodiment depicted, the force exerted by biasing members 42, 44, against upper lever arms 36*b*, 38*b* (and resisted by the guide rail through roller 8) may be adjusted by the position of members 50, 52. Outward and inward movement of lever arms 36, 38, is limited by restraints 54, 56, respectively. Each respective restraint 54, 56, includes cantilevered shaft 54*a*, 56*a* extending from base 10, and rubber bumpers 54*b*, 56*b* on the outside the positions of which can be adjusted by positioning retainers 54*c*, 56*c*, illustrated as nut pairs, and 54*d*, 56*d* on the inside the positions of which can be adjusted by positioning retainers 54*e*, 56*e*, illustrated as nut pairs. Restraints 54, 56 may be of any suitable construction or components. The respective distal ends of lever arms 36, 38, are connected to each other through cross member 60, causing each lever arm 36, 38 to remained in proper alignment with the other. Actuator 62 is disposed at cross member 60.

Since, in the embodiment depicted, the construction of actuators 32, 34 and 62 is substantially the same, only actuator 32 will be described in detail, it being understood that the same description applies to actuators 34 and 62, and that there are other suitable configurations for actuators 32, 34 and 62. Referring to FIGS. 5-8, actuator 32 is diagrammatically illustrated. In the embodiment depicted, actuator 32 includes first mount 64 and a second mount 66 constructed from steel SAE 1020, or any other suitable material. First mount 64 may be associated with first magnet 68 and second magnet 70 and second mount 66 may be associated with third magnet 72 and fourth magnet 74. Magnets 68, 70, 72, 74 may be integral with, or attached in any suitable manner, to first mount 64 and second mount 66, respectively. With reference also to FIGS. 2-4, mounts 64 and 66 are carried by base 10.

Magnets 68, 70, 72, 74 may be constructed from any suitable material and/or alloy such as, for example, NdFeB 40 MGOe, or any other suitable material such as other NdFeB alloys. Actuator 32 may be configured such that first magnet 68 and second magnet 70 are positioned adjacent one another in-line perpendicular to the vertical axis of the elevator shaft, having opposite polarity, and third magnet 72 and fourth magnet 74 are positioned adjacent one another in-line perpendicular to the vertical axis of the elevator shaft, having opposite polarity.

Figure 8:
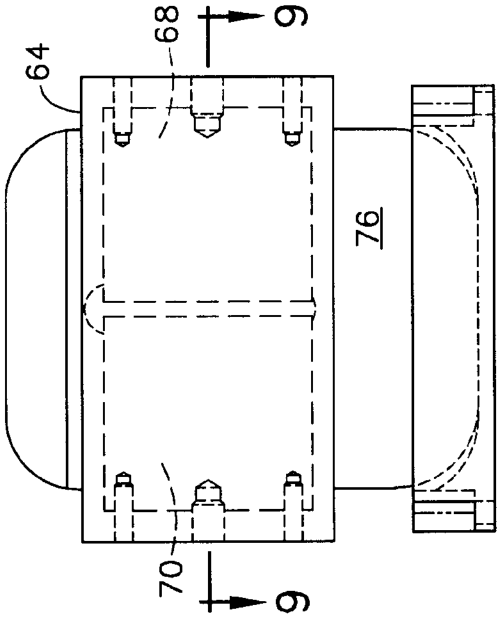
FIG. 8 is a front view of the actuator of FIG. 5.
Figure 6:
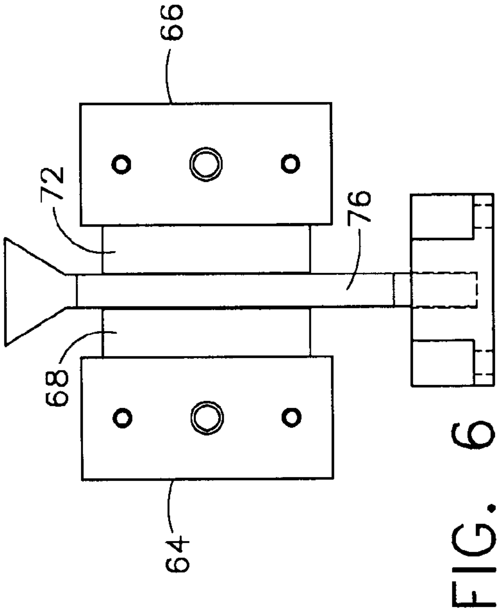
FIG. 6 is a right-side view of the actuator of FIG. 5.
Figure 7:
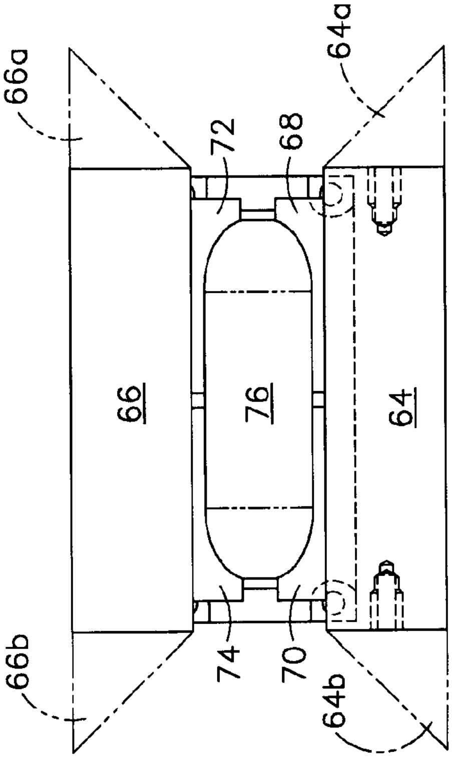
FIG. 7 is a top view of the actuator of FIG. 5.
Figure 9:
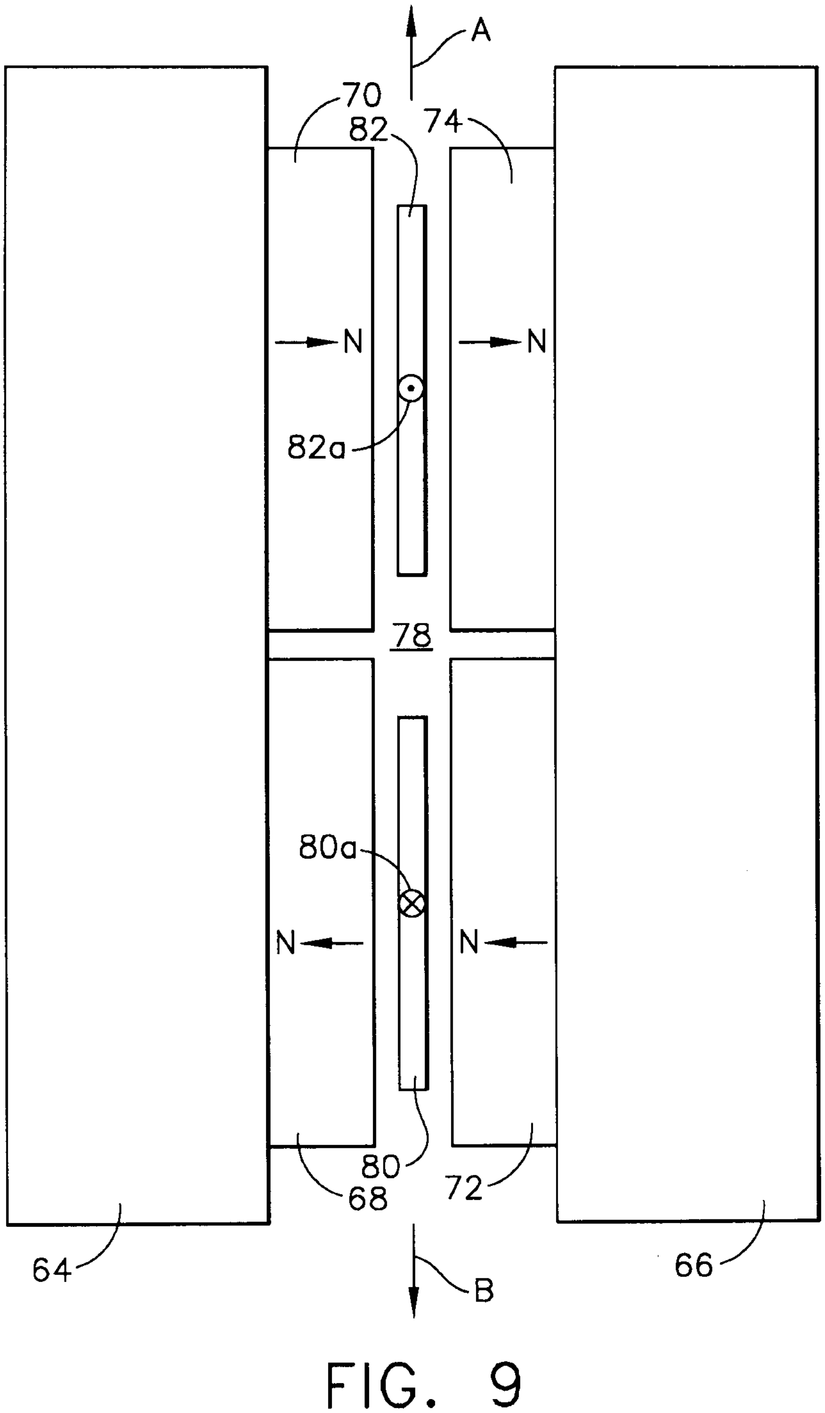
FIG. 9 is a diagrammatic cross-section taken along line 9-9 of FIG. 8.

Referring to FIG. 9, which is a diagrammatic cross-section (with cross hatching omitted for clarity) taken along line 9-9 of FIG. 8, the direction of North for each magnet 68, 70, 72, 74 is shown. In the embodiment depicted, third magnet 72 and fourth magnet 74 are configured such that they each face inward from second mount 66 and interact magnetically with first magnet 68 and second magnet 70. As seen, mounts 64, 66 and magnets 68, 70, 72, 74 may be configured such that first magnet 68 faces third magnet 72 creating a first magnetic pair with the north pole of first magnet 68 facing and spaced apart from the south pole of third magnet 72. Similarly, a second magnetic pair is created by second magnet 70 and fourth magnet 74, with the north pole of second magnet 70 facing and spaced apart from the south pole of fourth magnet 74. Mounts 64, 66 may be of any suitable shape configured to provide the desired magnetic flux field and density. For example, as seen in FIG. 7, ends 64*a*, 64*b*, 66*a*, 66*b* of mounts 64, 66 may have a trapezoidal shape as illustrated by phantom lines. These edges of mounts 64, 66 may, for example, be ½ inch to 1 inch longer at each end. The shape of ends 64*a*, 64*b*, 66*a*, 66*b* may affect the roll off of the force generated on coil 76 as coil 76 moves away from its center position, without affecting the force on coil 76 while at its center position.

Still referring to FIGS. 5-10, coil 76 is disposed between first mount 64 and second mount 66, which is operably configured to magnetically interact with magnets 68, 70, 72, 74. Coil 76 is carried by upper lever arm 12*b*, such that magnetic forces acting upon coil 76 produces force on upper lever aim 12*b* in a direction which adds to or opposes the force exerted by resilient member 16 on upper layer arm 12*b*. Coil 76 may be of any suitable construction. With reference also to FIG. 11, in the embodiment depicted, coil 76 comprises a plurality of turns of insulated wire formed in a toroidal shape, although any suitable shape may be used. For example, in the embodiment depicted, coil 76 is configured from 250 feet of 23 American Wire Gauge (AWG), is insulated with a thin layer of resin or the like. Coil 76 is depicted as containing central region 78, dividing coil 76 into first region 80 positioned between first magnet 68 and third magnet 72 of the first magnetic pair and second region 82 positioned between second magnet 70 and fourth magnet 74 of the second magnetic pair. The current flows in the same direction through the wires which make up first region 80, such as into the page as indicated at 80*a*. The current flows in the same direction through the wires which make up second region 82, such as out of the page as indicated at 82*a*. Since coil 76 is a continuous loop, as can be seen in FIG. 11, the direction of current flow in region 80 is opposite the direction of flow in region 82.

Figure 9A:
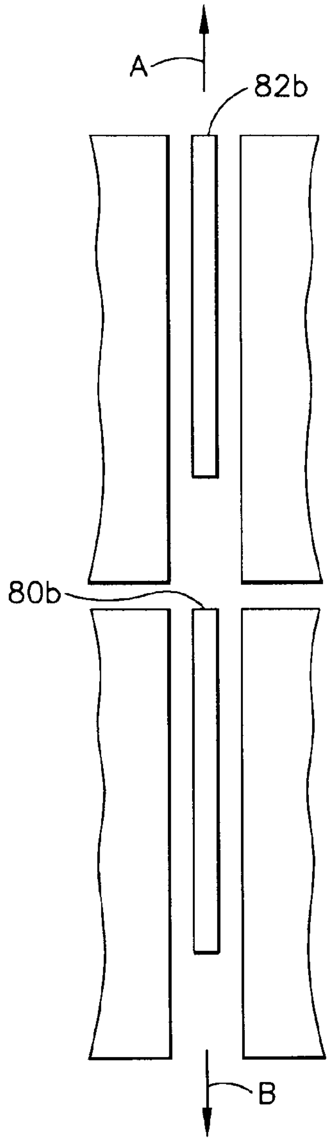
FIGS. 9A and 9B are a fragmentary enlarged view of a portion of FIG. 9 diagrammatically illustrating movement of the coil between the magnetic pairs.
Figure 10:
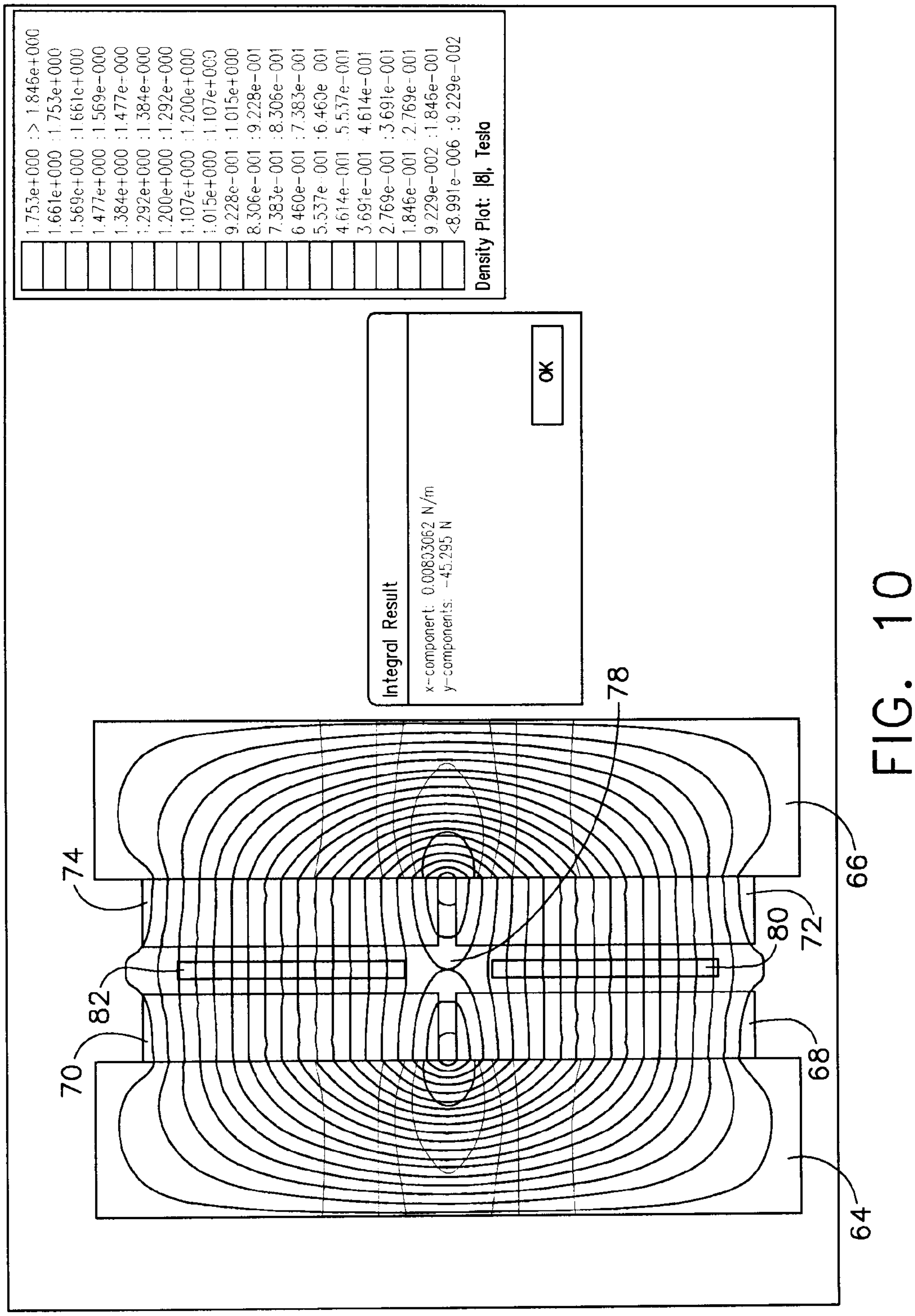
FIG. 10 diagrammatically illustrates lines of magnetic flux between magnets supported by mounting blocks.
Figure 11:
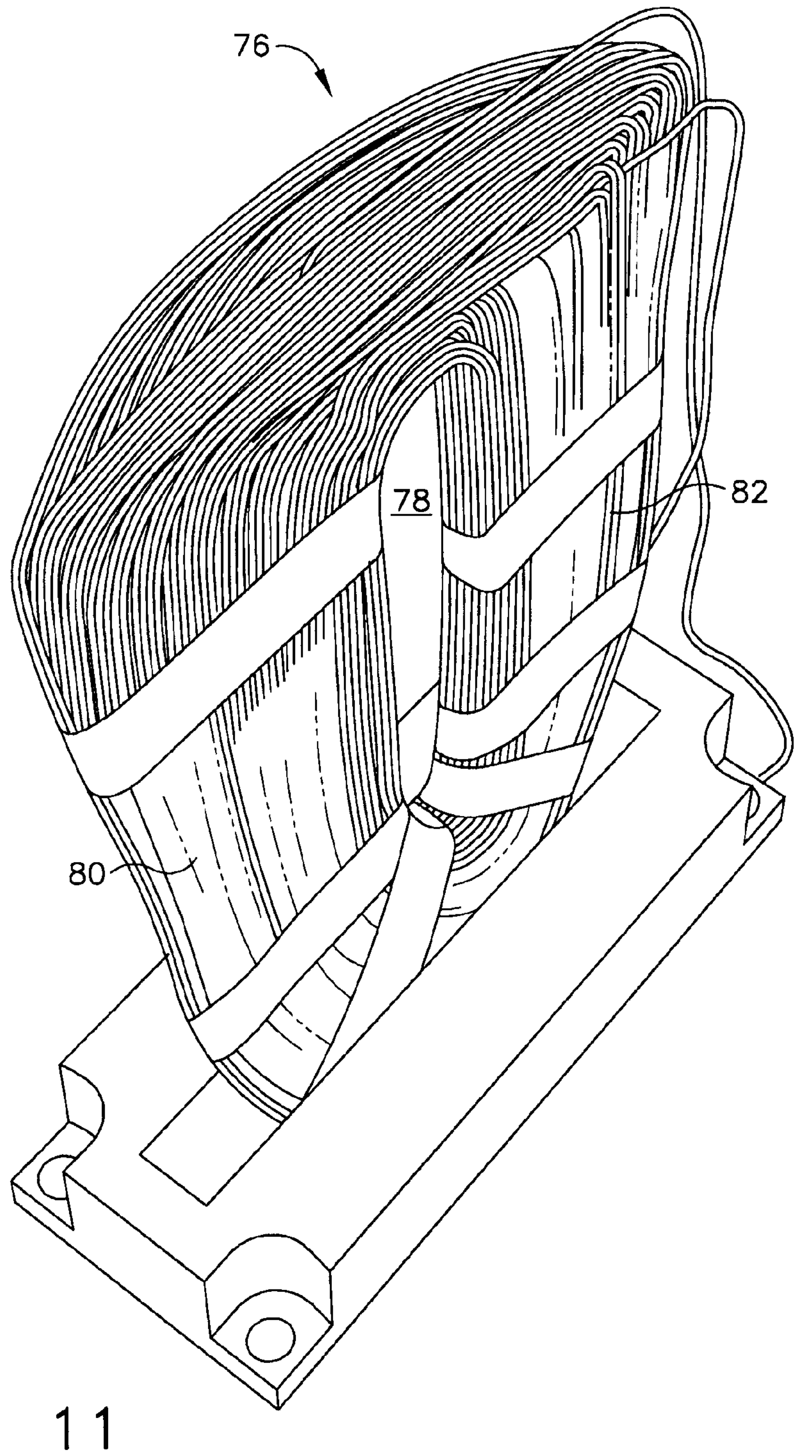
FIG. 11 is a perspective photograph of an embodiment of the coil of the actuator of FIG. 7.

In the embodiment depicted, the first magnetic pair has a polarity opposite that of the second magnetic pair, concentrating the magnetic lines of flux as seen in FIG. 10, which illustrates lines of magnetic flux between magnets supported by mounting blocks (with coil 76 not energized), such that stability of the elevator system is improved. As seen in FIG. 9, in the embodiment depicted, the magnetic pairs extend beyond each side of regions 80 and 82. As coil 76 initially moves in either direction of arrows A and B, regions 80 and 82 remain within the respective gaps defined by each magnetic pair. FIG. 9A illustrates regions 80, 82 disposed at respective edges of the gaps defined by each magnetic pair. With reference to FIG. 10, the lines of magnetic flux are relatively uniform to the edges of the gaps defined by each magnetic pair. Since each magnetic pair is arranged in opposite polarity, the current flow through coil 76 produces a force on coil 76 which is in the same direction (such as a center seeking restoring force in the direction of arrow B to provide dampening) on each region 80, 82 due to the opposite direction of current flow through each region 80, 82.

Figure 9B:
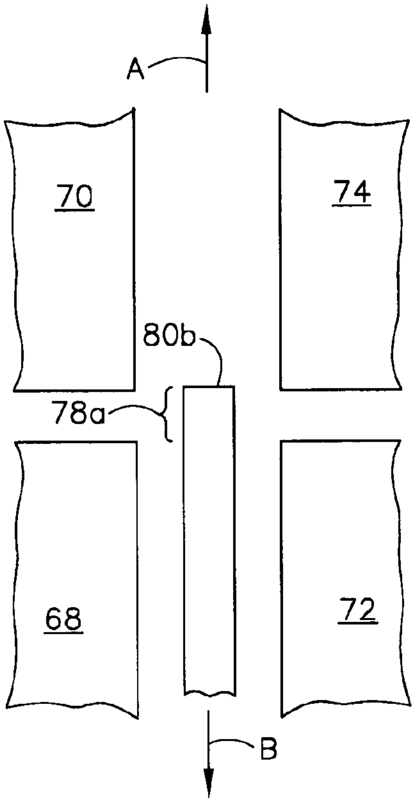

As the edge of each region 80, 82 moves beyond the respective ends of the gaps defined by the respective magnetic pairs, the effect of the magnetic pair begins to diminish or roll off. For the edge of either region 80 or 82 which moves into and through central region 78, and into the gap defined by the other magnetic pair, the direction of the force on that region 80 or 82 changes. For example, referring to FIG. 9B, edge 80*b* is illustrated disposed aligned with the edges of magnets 70, 74, and will enter the gap defined by that magnetic pair with any further movement in the direction of arrow A. As edge 80*b* moved through transition area 78*a*, the effect of the magnetic flux between the first magnetic pair of magnets 68 and 72 decreased while the effect of the magnetic flux between the second magnetic pair of magnets 70 and 74 increased. Because of the direction of current through region 80, the force exerted by the second magnetic pair on region 80 is in the direction of arrow A, opposite from the direction of the force exerted on region 80 by the first magnetic pair. As edge 80*b* advances further into the gap defined by the second magnetic pair, the magnitude of the force increases. The force and flux density provided by this configuration of actuator 32 (as well as actuators 34 and 64) results in increased elevator stability, using fewer magnets than conventional devices, and by providing a reduced mass coil. Such features may benefit the stability of the elevator system cost effectively.

Within the teachings of the present invention, the air gap flux between magnetic pairs is configured by utilizing shaped magnetic shunts (e.g., mounts 64, 66) at its extremes in such a manner as to create the force pattern desired. The magnetic shunts may enable actuator force changes to be inherent in the actuator design and thus do not rely on actuator driver filters, tuning, response, and/or position limiters of a control system. This version may result in improved response capabilities and may limit damper activations that can lower ride quality.

The shape of actuator 32 may also be modified to create the force pattern desired. It will be appreciated that actuator 32 may be constructed from any suitable material, may contain any suitable number of magnets, coils, and/or mounts, and may be configured with any suitable shape or dimensions to facilitate elevator system stability.

Unevenness in the guide rails, lateral components of traction forces originated from the traction cables, positional changes of the load during travel, and aerodynamic forces, for example, may cause oscillation of the car frame and the elevator car, and thus impair travel comfort. Position sensors may be used with each roller guide to continually monitor the position of the lever arms. Accelerometers may be utilized to measure transverse oscillations or accelerations acting on the car frame.

Figure 12:
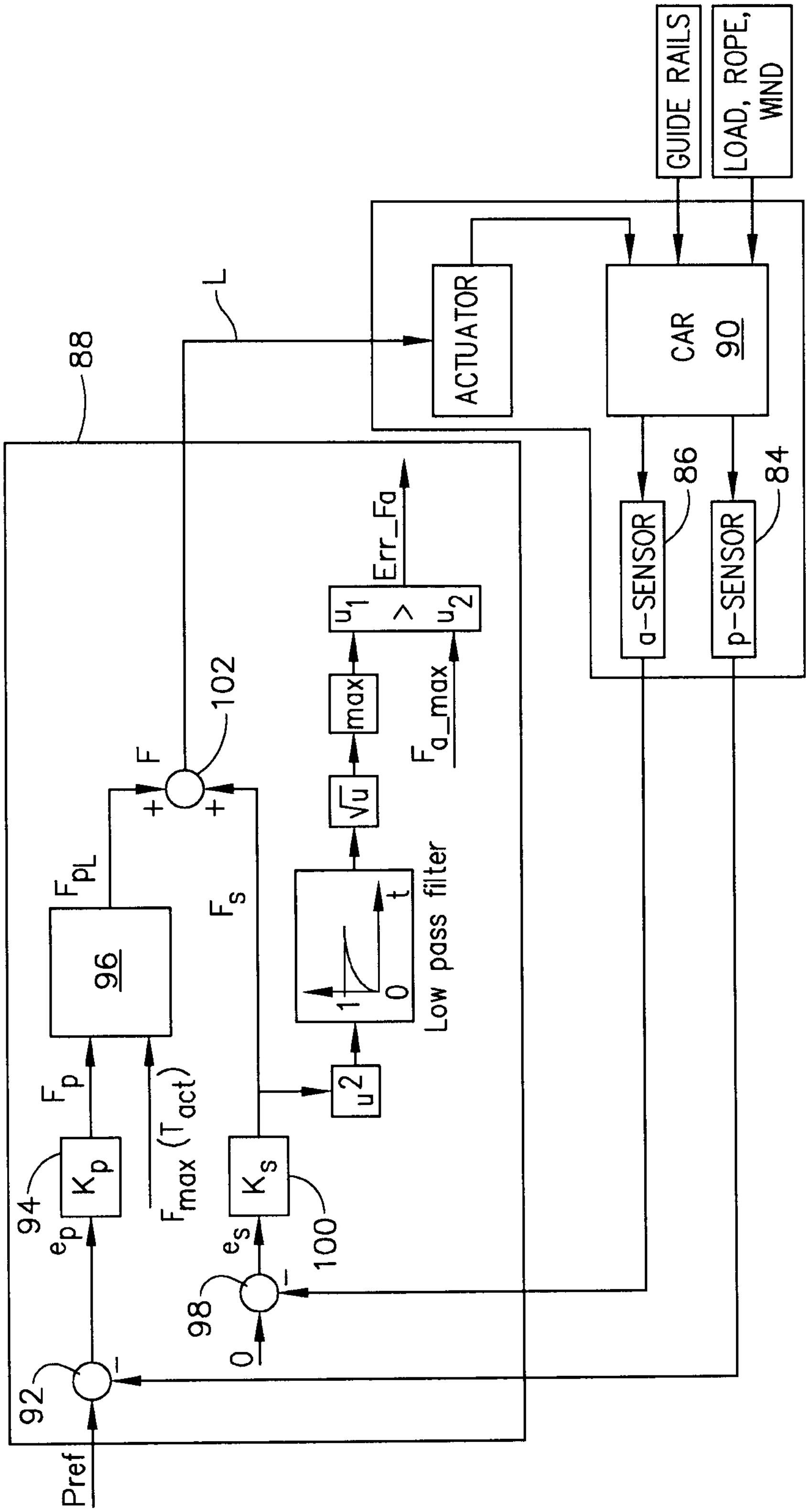
FIG. 12 is a schematic diagram illustrating a signal flow diagram of the active guiding and balance control system constructed according to the teachings of the present invention.

Referring to FIG. 12 is a schematic diagram illustrating a signal flow diagram of an active guiding and balance control system constructed according to the teachings of the present invention. A signal flow diagram of the active ride control system incorporating instability detection signals derived from position sensors 84 and/or accelerometers 86 may be fed into a controller box mounted on the elevator car. The controller box may contain the power electronics to drive the actuators 32, 34, 36 and closed loop feedback controller 88 processing the signals from sensors 84 and 88 to operate actuators 32, 34, 60 in directions such to oppose the sensed oscillations. Thereby, damping the oscillations acting on the frame and the elevator car may be achieved. Oscillations may be reduced to the extent that they are imperceptible to the elevator passenger.

External disturbances act on the elevator car and car frame as they travel along the guide rails. These external disturbances may comprise high frequency vibrations due mainly to the unevenness of the guide rails and relatively low frequency forces produced by asymmetrical loading of the elevator car, lateral forces from the traction cable, and air disturbances or wind forces. The disturbances may be sensed by the position sensors 84 and/or accelerometers 86, where the position sensors 84 and/or accelerometers 86 may produce signals that are fed into controller 88.

In controller 88, the sensed position signals may be compared with reference values $P_{ref}$ at summation point 92 to produce position error signals $e_p$. The position error signals $e_p$ may then be fed into a position feedback controller 94 which produces an output signal $F_p$ which may be fed into a displacement algorithm 96. The displacement algorithm 96 may compare, for example, the $F_p$ to a pre-programmed non-linear measurement plot such that a signal is sent to the actuator 32 to diminish or vary the Lorenz force associated with the active system. It will be appreciated that the displacement algorithm 96 may combine, compare, and/or analyze any suitable number of conditions or factors to provide a desirable balance between active system control, stability, and passenger comfort to the elevator system. It is contemplated that an output signal $F_p$, or a command from the displacement algorithm 96, may be transmitted directly to the actuator 32 in the absence of accelerometers 86.

Still referring to FIG. 12, should accelerometers 86 be provided, the signals from accelerometers 86 may be inverted at summation point 98 and fed into an acceleration feedback controller 100 as acceleration error signals $e_s$. The output $F_s$ from the acceleration controller 100 may be combined with the output $F_{pl}$ from the displacement algorithm 96 at summation point 102. The resulting output control signals F, $F_p$, and/or $F_{pl}$ may be used as the input for a power amplifier (not shown) to produce current for the actuators 32, 34, 60 to counteract the disturbance forces and thus reduce vibrations on the car.

The output $F_a$ of the acceleration controller 100 may contain a broad band of frequencies and the amplitude of the higher frequency signals may be relatively large. To detect instability, time duration may also be evaluated. A good measurement of stability may be the root means square or RMS value. It is a measure for the energy or power that is contained in a signal and time duration weighting can be chosen freely. The moving RMS value can be compared with a maximum admissible value and if it exceeds the admissible value, an error flag may be set true. The error signal may not fully deactivate the active control system, which provides a comfortable ride for passengers, but may, rather, vary the Lorentz force developed by the first actuator. The Lorentz force may be varied by the first actuator depending upon the degree of displacement. For example, controller 88 may be programmed such that a threshold measurement of displacement of 6 or −6 triggers a reduction of the Lorentz force to a level lower than that provided during normal operation. Applied Lorentz force may be varied along at least a partially non-linear continuum relative to displacement. It will be appreciated that actuator 32 may be provided with adaptive multi-band vibration suppression based on when, how much, and which frequency needs to be suppressed. Sensors operably configured to monitor a frequency range may send an indication of a detected frequency, for example, to the displacement algorithm, such that action may be taken specific to vibration caused by that particular frequency.

Figure 13:
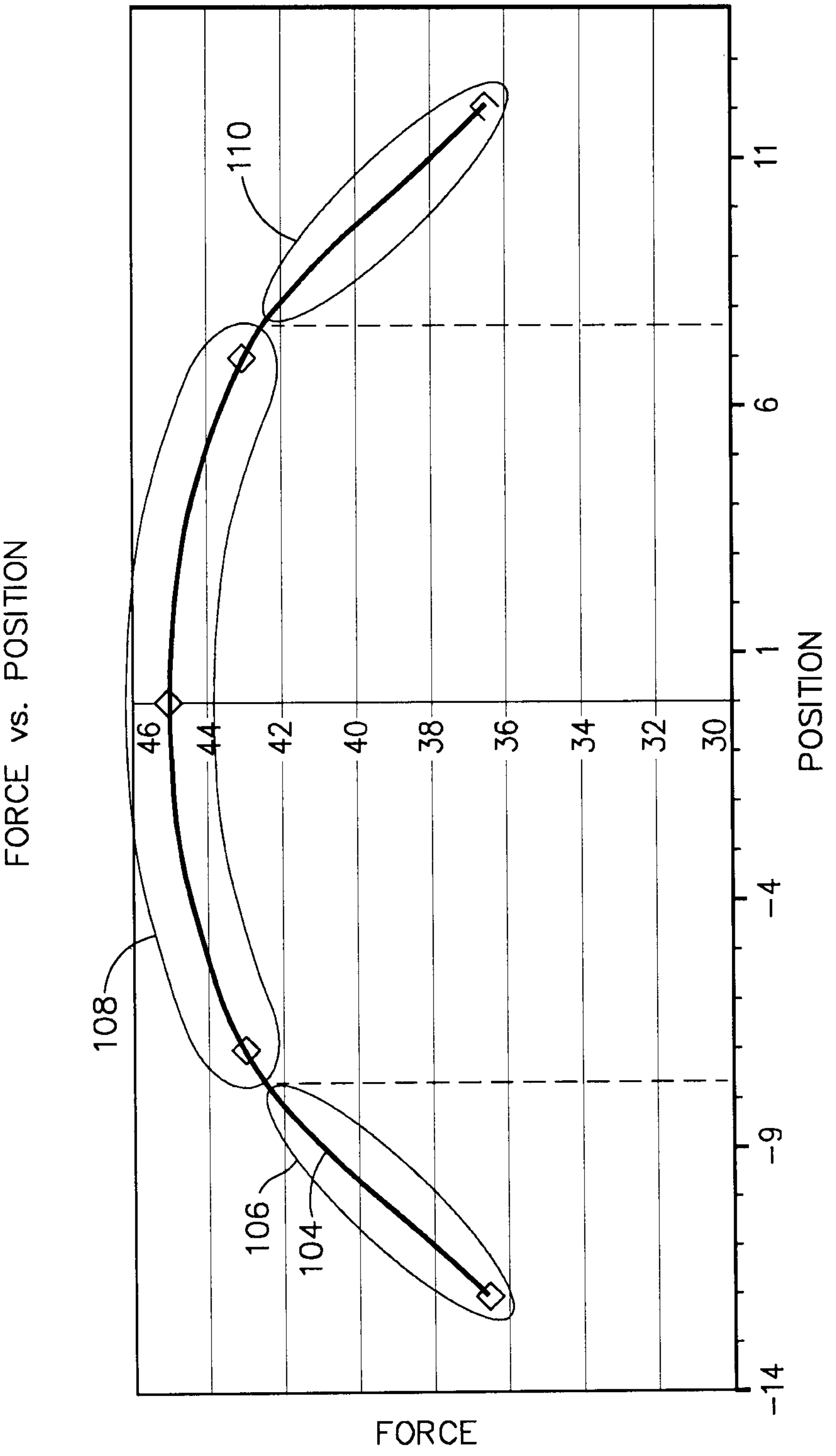
FIG. 13 is a graph depicting a first version of a non-linear relationship between displacement and Lorentz force in the active guiding and balance device.
Figure 13A:
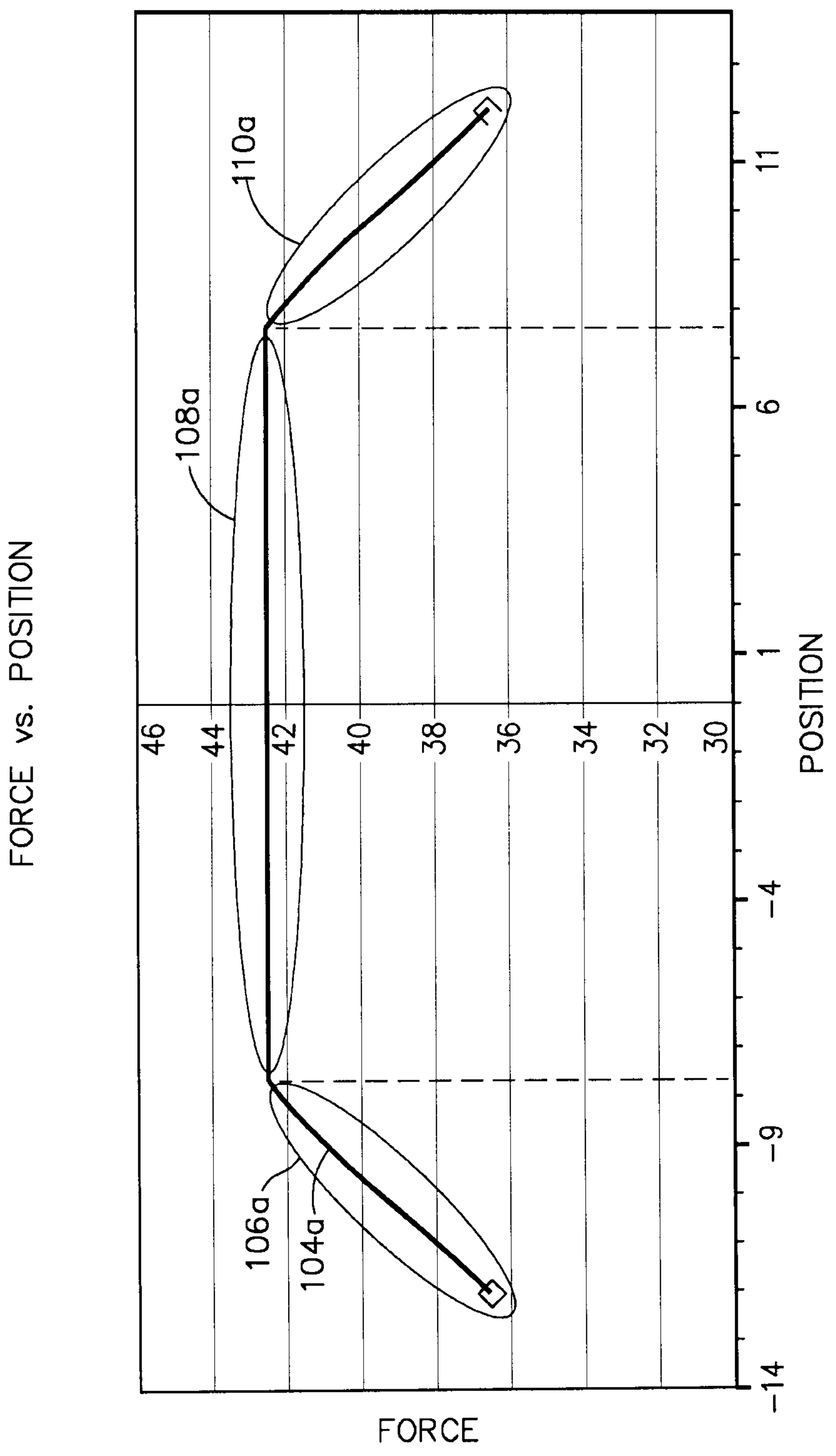
FIG. 13A is a graph depicting a second version of a linear relationship between displacement and Lorentz force in the active guiding and balance device.

FIGS. 13 and 13A illustrate two versions of the Lorentz force that may be created by actuators 32, 34, 62, Plots 104, 104*a* illustrate one example of the relationship between displacement, as measured along the x axis, and force, as measured along the y axis, of an elevator system. Actuators 32, 34, 62 may be configured as a linear motor as described, with at least one fixed magnet and a moving coil having a low mass such that it may respond to frequencies of between 2 and 200 Hz. As discussed above, when the moving coil is energized with an electric current, the coil may move relative to the permanent magnet creating a force that may be used to dampen vibration. In one version, the Lorentz force created by the first actuator is non-linear relative to displacement at high levels of displacement such as, for example, at a displacement of greater than 7 mm in either direction. In FIG. 13, region 108 is illustrated as nearly linear, and in FIG. 13A, region 108*a* is illustrated as linear, each at 7 mm or less of displacement. In FIG. 13, high displacement regions 106 and 110 may be nearly linear as illustrated, or as seen in FIG. 13A, high displacement regions 106*a* and 110*a* may be linear, wherein the application of Lorentz force is diminished, but not stopped, to dampen vibrations while still retaining at least partial active control of an elevator system.

It will be appreciated that any suitable level of displacement may be associated with any suitable level of Lorentz force, or any other suitable force, to maintain active control of an elevator system at high levels of displacement. Actuator 32, or any other suitable actuator, may be configured such that any portion of plot 104, 104*a* may be linear or non-linear. For example, the linear regions as seen in FIG. 13A may range from a displacement of from about −20 mm to about 20 mm displacement, from about −7 mm to about 7 mm displacement, from about −5 mm to about 5 mm displacement, from about −10 mm to about 10 mm displacement, from about −20 to about 20 mm displacement, from about −7 mm displacement to about 3 mm displacement, and/or from about −3 mm to about 7 mm displacement. It will be appreciated that actuator 32 may be configured such that plot 104 is asymmetrical with respect to the y-axis.

Still referring to FIG. 13, one version of a maximum force and flux density graph at the linear zone is shown. The force refers to the quantity of magnetic field force, or "push." The flux density refers to the amount of magnetic field flux concentrated in a given area, where the field flux is the quantity of total field effect, or "substance" of the field. As moving coil 76 approaches the limits of travel, less force is produced. This force profile is advantageous because a full force impact into a physical stop can cause the system to become unstable. The fact that the force is reduced and working against spring that the force, gives the control system time to develop and implement an improved solution. Vibration dampening such as this, requires extremely fast processing of solutions.

Figure 12A:
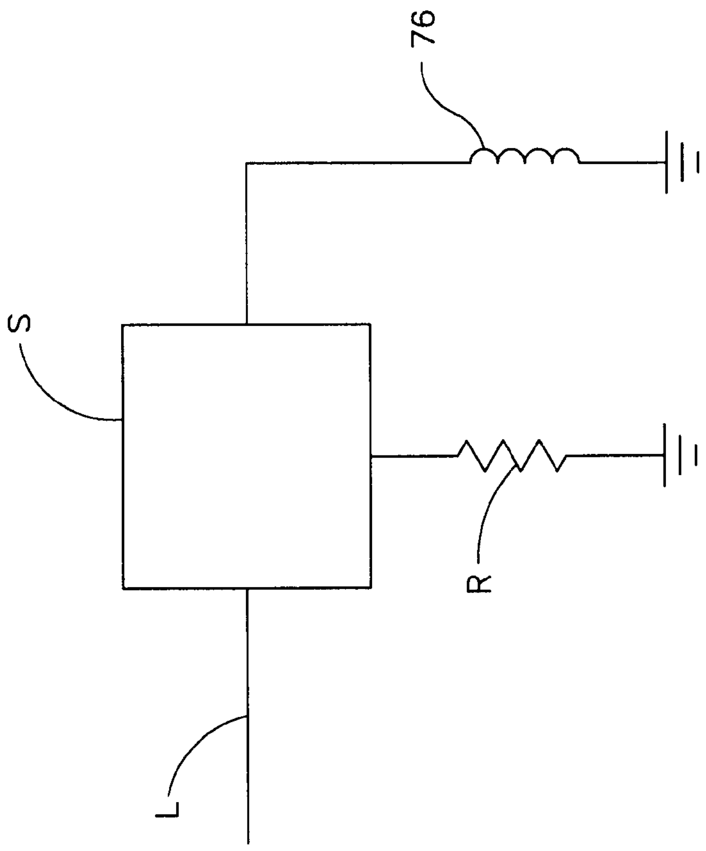
FIG. 12A illustrates is a diagrammatic illustration of an alternate embodiment of the active guiding and balance control system.

In one embodiment, in the event of a loss of power or driver faults, power to the actuators is disconnected and a shunt resistor is connected across the coil of the actuator. Referring to FIG. 12A, control signal L may be directed into a relay or solid state device S, which when there is power, allows the signal L to be directed to coil 76. In the event of a power failure, device S would cause resistor R to be placed in series with coil 76. This allows coil 76 to function as a dynamically stronger virtual spring. Resistor R is selected based on the size of coil 76 and the elevator car characteristics. Resistor R may be adjustable to allow tuning to a particular elevator car while on site. Coil 76 moving through magnets produces electricity, which is applied across the shunt resistor R. Resistor R dissipates energy as heat, stiffening the dampening to add to the springs, therefore not just mechanical springs are in the passive mode, but as a generator providing damping at midpoints.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. An elevator system comprising:

a. at least one elevator shaft;

b. an elevator car disposed to move within said at least one elevator shaft, said elevator car being guided by at least one guide rail, said elevator car including first and second guide elements cooperating with said at least one guide rail to guide said elevator car;

c. a first actuator controlling said first guide element, said first actuator configured to exert force on only said first guide element of said first and second guide elements, said first actuator configured to dampen oscillations of said elevator car by exerting force on said first guide element, said first actuator comprising:

i. a member which is moveable within a first high displacement region, a second high displacement region, and a central region disposed therebetween;

ii. said first actuator configured to exert less force on said first guide element when said member is disposed within either of said first high displacement region and said second high displacement region; and d. a second actuator controlling said second guide element, said second actuator configured to exert force on only said second guide element of said first and second guide elements.

2. The elevator system of claim 1, wherein said member comprises an electrical coil.

3. The elevator system of claim 2, wherein said member is disposed between a plurality of magnets.

4. The elevator system of claim 3, wherein said plurality of magnets are carried by at least one trapezoidally shaped mount.

5. The elevator system of claim 3, wherein said magnets are stationary relative to said car.

6. The elevator system of claim 3, wherein said first actuator comprises a. first and second spaced apart mounts;

b. two pairs of magnets, each pair comprising first and second spaced apart aligned magnets, said first and second magnets of each pair having a polarity extending in the same direction, each of said first magnets being carried by said first mount and each of said second magnets being carried by said second mount thereby defining a gap therebetween, the polarity of said first pair extending in the opposite direction from the polarity of said second pair.

7. The elevator system of claim 6, wherein said electrical coil is disposed at least partially within said gap.

8. The elevator system of claim 1, wherein said first actuator comprises a linear motor.

9. The elevator system of claim 1, wherein said force is generally linear when said member is disposed within said first high displacement region, is generally linear when said member is disposed within said second high displacement region and is generally linear when said member is disposed within said central region.

10. The elevator system of claim 1, comprising spring force exerted on a select one or both of said first and second guide elements, and a controller configured to control a select one or both of said first and second actuators to augment or diminish said spring force.

11. An apparatus for dampening oscillations of an elevator car, the elevator car guided by rails, said apparatus comprising:

a. first and second guide elements cooperating with at least one of said rails to guide said elevator car;

b. a first actuator controlling said first guide element, said first actuator configured to exert force on only said first guide element of said first and second guide elements;

c. a second actuator controlling said second guide element, said second actuator configured to exert force on only said second guide element of said first and second guide elements;

d. each actuator of said first and second actuators respectively comprising:

i. a member which is moveable within a first high displacement region, a second high displacement region, and a central region disposed therebetween;

ii. said actuator configured to exert less force on said associated guide element when said member is disposed within either of said first high displacement region and said second high displacement region.

12. The apparatus of claim 11, wherein said member comprises an electrical coil.

13. The apparatus of claim 12, wherein said member is disposed between a plurality of magnets.

14. The apparatus of claim 13, wherein said plurality of magnets are carried by at least one trapezoidally shaped mount.

15. The apparatus of claim 13, wherein said magnets are stationary relative to said car.

16. The apparatus of claim 13, wherein each said actuator of said first and second actuators comprises a. first and second spaced apart mounts;

b. two pairs of magnets, each pair comprising first and second spaced apart aligned magnets, said first and second magnets of each pair having a polarity extending in the same direction, each of said first magnets being carried by said first mount and each of said second magnets being carried by said second mount thereby defining a gap therebetween, the polarity of said first pair extending in the opposite direction from the polarity of said second pair.

17. The apparatus of claim 16, wherein said electrical coil is disposed at least partially within said gap.

18. The apparatus of claim 11, wherein each said actuator of said first and second actuators comprises a linear motor.

19. The apparatus of claim 11, wherein said force is generally linear when said member is disposed within said first high displacement region, is generally linear when said member is disposed within said second high displacement region and is generally linear when said member is disposed within said central region.

20. The apparatus of claim 11, comprising respective spring force exerted on each said actuator of said first and second actuators, and a controller configured to control each said actuator of said first and second actuators to augment or diminish each said respective spring force.

* * * * *